US012808685B2

(12) United States Patent
Englund

(10) Patent No.: US 12,808,685 B2
(45) Date of Patent: Nov. 24, 2026

(54) FIBRE OPTIC SENSING METHOD AND SYSTEM FOR GENERATING A DYNAMIC DIGITAL REPRESENTATION OF OBJECTS AND EVENTS IN AN AREA

(71) Applicant: FIBER SENSE LIMITED, Mosman (AU)

(72) Inventor: Mark Andrew Englund, Mosman (AU)

(73) Assignee: Fiber Sense Limited, Mosman (AU)

( * ) Notice: Subject to any disclaimer, the term of this patent is extended or adjusted under 35 U.S.C. 154(b) by 173 days.

(21) Appl. No.: 18/028,517

(22) PCT Filed: Sep. 28, 2021

(86) PCT No.: PCT/AU2021/051129

§ 371 (c)(1),
(2) Date: Mar. 24, 2023

(87) PCT Pub. No.: WO2022/061422

PCT Pub. Date: Mar. 31, 2022

(65) Prior Publication Data

US 2023/0358562 A1 Nov. 9, 2023

(30) Foreign Application Priority Data

Sep. 28, 2020 (AU) ................................ 2020903494

(51) Int. Cl.
*G01H 9/00* (2006.01)
*G01C 21/00* (2006.01)
*G06N 3/08* (2023.01)

(52) U.S. Cl.
CPC ..... *G01C 21/3833* (2020.08); *G01C 21/3807* (2020.08); *G01C 21/3878* (2020.08);
(Continued)

(58) Field of Classification Search
CPC ............ G01C 21/3833; G01C 21/3807; G01C 21/3878; G01H 9/002; G01H 9/004;
(Continued)

(56) References Cited

U.S. PATENT DOCUMENTS 7,136,156 B1 11/2006 Quint
8,077,539 B2 * 12/2011 Smith ................. G10K 11/205
367/2

(Continued)

FOREIGN PATENT DOCUMENTS

CN 101051869 A 10/2007
CN 102243795 A 11/2011

(Continued)

OTHER PUBLICATIONS

Davidson, "Meteorologist Ryan Davidson Explains Weather Maps", Youtube.com 2014 (Year: 2014).*

(Continued)

*Primary Examiner* — Hitesh Patel
*Assistant Examiner* — Shien Ming Chou
(74) *Attorney, Agent, or Firm* — Morgan, Lewis & Bockius LLP

(57) ABSTRACT

Described herein is a fibre optic sensing method and system for generating a dynamic digital representation of objects and associated zones in a geographic area. The disclosed method and system comprises (a) generating a zone feature dataset, including identifying and classifying the associated zones in the area, each zone being classified into a zone type based on static and/or quasi-static zone features and having at least two object-sensed conditions; (b) generating an object tracking dataset, including tracking signals of at least some of the plurality of objects in the geographic area using a distributed fibre optic sensing network, and processing the tracking signals to obtain object-specific tracking data; (c)

(Continued)

generating an event dataset, including using the tracking data to determine when the conditions of the zones are changing; digitizing and storing the changed conditions of the zones; and (d) rendering a dynamic representation of the conditions of the zones.

20 Claims, 13 Drawing Sheets

(52) U.S. Cl.
CPC ............ *G01H 9/002* (2013.01); *G01H 9/004* (2013.01); *G06N 3/08* (2013.01)

(58) Field of Classification Search
CPC ........ G06N 3/08; G06N 3/0464; G08G 1/141; G08G 1/0133; G08G 1/0141; G08G 1/015; G08G 1/04; G08G 1/13; G08G 1/146; G08G 1/147; G08G 1/137; G01S 2205/01; G01S 5/18; G01S 17/89; G01S 13/89; G01S 17/894; H04W 4/029; B61L 25/028; G02B 6/02
USPC .......................................................... 701/450
See application file for complete search history.

(56) References Cited

U.S. PATENT DOCUMENTS

| | | | | |
|---|---|---|---|---|
| 2010/0158431 | A1 | 6/2010 | Huffman et al. | |
| 2011/0069302 | A1 | 3/2011 | Hill et al. | |
| 2012/0226452 | A1 | 9/2012 | Hill et al. | |
| 2012/0230629 | A1 | 9/2012 | Hill et al. | |
| 2016/0252414 | A1 | 9/2016 | Preston et al. | |
| 2017/0193825 | A1 | 7/2017 | Schlechter et al. | |
| 2017/0205253 | A1 | 7/2017 | Handerek | |
| 2017/0307435 | A1 | 10/2017 | Park | |
| 2018/0342156 | A1 | 11/2018 | Martin et al. | |
| 2019/0005387 | A1* | 1/2019 | Blayvas | G06N 3/045 |
| 2020/0124430 | A1 | 4/2020 | Bradlow et al. | |
| 2020/0191613 | A1* | 6/2020 | Englund | G01H 9/004 |
| 2022/0011406 | A1* | 1/2022 | Shrestha | G02B 6/42 |
| 2022/0018980 | A1* | 1/2022 | Englund | G01H 9/004 |

FOREIGN PATENT DOCUMENTS

| | | | | | |
|---|---|---|---|---|---|
| CN | 107591002 | A | | 1/2018 | |
| DE | 102018007567 | A1 | * | 7/2019 | |
| JP | 2000275356 | | | 10/2000 | |
| JP | 2003344148 | A | | 12/2003 | |
| JP | 2009133760 | | | 6/2009 | |
| JP | 2009189655 | A | | 8/2009 | |
| JP | 2010515094 | A | | 5/2010 | |
| JP | 2019537721 | A | | 12/2019 | |
| WO | WO-2015088313 | A1 | * | 6/2015 | G01G 19/021 |
| WO | WO2015/158926 | A1 | | 10/2015 | |
| WO | WO/2018/045433 | A1 | | 3/2018 | |

OTHER PUBLICATIONS

Cho, "Adaptive near-field beamforming techniques for sound source imaging", Journal of the Acoustic Society of America, 125(2) 944-957 (Year: 2008).*

Fiber Sense Limited, Communication Pursuant to Article 94(3), EP17869895.7, Apr. 12, 2023, 47 pgs.

Fiber Sense Limited, Extended European Search Report, EP21870607.5, Sep. 24, 2024, 40 pgs.

Notice of Reasons for Refusal, CN2021-526397, Nov. 7, 2023, 11 pgs.

Fiber Sense PTY Ltd, International Search Report and Written Opinion, PCTAU2021051129, Dec. 13, 2021, 10 pgs.

Fiber Sense PTY Ltd, International Preliminary Report on Patentability, PCTAU2021051129, Mar. 28, 2023, 7 pgs.

Notice of Rejection, JP2023-519521, Aug. 5, 2025, 4 pgs.

* cited by examiner

| Objects | Events |
| --- | --- |
| 806A | Leaving bus stop 803 |
| 806B | Entering off-street parking slot 804A |
| 806C | Driving |
| 806D | Driving |
| 806E | Parked at off-street parking slot 804B |
| 806F | Parked at uncovered carpark slot 805-N |
| 804A | Vacant - will became occupied |
| 803 | Vacant - just became Vacant |
| 805-1 | Vacant |
| 805-N | Occupied |

FIBRE OPTIC SENSING METHOD AND SYSTEM FOR GENERATING A DYNAMIC DIGITAL REPRESENTATION OF OBJECTS AND EVENTS IN AN AREA

This present disclosure application is a United States National Stage Application filed under 35 U.S.C. § 371 of PCT Patent Application Serial No. PCT/AU2021/051129, filed on Sep. 28, 2021, titled "Fibre Optic Sensing Method And System For Generating A Dynamic Digital Representation Of Objects And Events In An Area," which claims priority to Australian Patent Application No. 2020903494, filed Sep. 28, 2020, each of which is incorporated herein by reference in its entirety.

FIELD OF THE INVENTION

The present disclosure generally relates to a fibre optic sensing method and system for generating a dynamic digital representation of objects and events in an area, which more specifically is based on wide scale deployment of distributed fibre sensing (DFS) over optical fibre cables. In particular, the present disclosure relates to a fibre optic sensing method and system for identifying and tracking objects such as vehicles and identifying events such as parking and forming a real time digital representation of an area with a plurality of objects and events being displayed dynamically.

BACKGROUND OF THE INVENTION

Fibre optic sensing, more specifically distributed fibre sensing (more specifically distributed acoustic sensing (DAS)), can detect acoustic emissions and vibrations from objects and events in surrounding regions along a fibre optic cable. An acoustic emission or vibration from an object such as a vehicle or pedestrian can be caused by contact of the object with the surface of a road or pavement. An evolving acoustic emission or vibration from a moving object can be used to classify the type of object and to form a dynamic track of the object location.

Known wide area surveillance systems for generating a digital representation of an area include those employing artificial visual means, which collect visual information for applying techniques such as machine vision to detect and represent objects and events. For example, closed-circuit television (CCTV) cameras have been used to monitor city streets. Each CCTV camera can provide one localised view of a streetscape at any one time with a depth of field of view determined by the optics of the CCTV camera. In case of a system with multiple CCTV cameras, the blind spots or the visually least clear spots in the city are potentially locations mid-way between CCTV cameras or outside a CCTV camera's field of view. However, it is difficult to achieve consistent quality and resolution of video data suitable for machine vision processing with CCTV across an urban area. As another example, millimetre wave radar systems can be used to image the dynamic objects in an area with relatively high movement precision. However, high angular resolution to denote areas in the far field is also not easily achieved. As yet another example, satellite imagery can provide a city-wide bird's eye view of objects that are in the satellite's unobstructed line-of-sight. Targets or events that are visually obstructed (e.g. under thick clouds) would therefore lack surveillance visibility from satellite images, which are also static. A light detection and ranging (LiDAR) system looking down on city areas has similar limitations as a satellite as it is line of sight only and will readily have blind spots.

Other known wide area surveillance systems for generating a digital representation of an area include those employing radio frequency means. For example, mobile cellular signals from mobile devices carried by users may be used to provide object movement information on, for instance, their locations from a GPS derived position from the mobile device or from a cellular tower by determining signal strength or signal information. However, the surveillance information obtainable from cellular signals may not be a reliable representation of the true number of objects being monitored and their approximate locations with respect to a cellular tower. For example, a person may have their mobile device switched off and/or there may be more than one person each with one or more mobile devices on one vehicle being monitored. Mobile devices may not be reliably able to convey classification data about the object they are associated with. Further, mobile device sourced GPS signals vary in strength across difference devices and some may be penetrating or reflected off buildings such that the signal strength becomes an unreliable indicator of position. In addition, mobile devices are network specific within a country and may not be ubiquitous.

Numerous types of vehicle-based tracking and navigation systems exist, and have proliferated for the management and control for intelligent transportation systems (ITS). These can make use of GPS derived position from GPS receivers on a vehicle, vehicle detection (VD) and cellular floating vehicle data (CFVD). A major disadvantage of these systems is that they require specific equipment or applications being installed on every vehicle being detected which means that it is highly likely that a substantial fraction of the vehicles in a given area are not detected in such a system.

Reference to any prior art in the specification is not, and should not be taken as, an acknowledgment or any form of suggestion that this prior art forms part of the common general knowledge in any jurisdiction or that this prior art could reasonably be expected to be understood, regarded as relevant and/or combined with other pieces of prior art by a person skilled in the art.

SUMMARY OF THE INVENTION

By way of clarification and for avoidance of doubt, as used herein and except where the context requires otherwise, the term "comprise" and variations of the term, such as "comprising", "comprises" and "comprised", are not intended to exclude further additions, components, integers or steps.

According to a first aspect of the disclosure there is provided a method of generating a dynamic representation of a plurality of objects and associated zones in a geographic area, the method comprising: generating a zone feature dataset, including identifying and classifying the associated zones in the area, each zone being classified into a zone type based on static and/or quasi-static zone identification features and having at least two object-sensed conditions; generating an object tracking dataset, including tracking signals of at least some of the plurality of objects in the geographic area using a distributed fibre optic sensing network, and processing the tracking signals to obtain object-specific tracking data; generating an event dataset, including using the tracking data to determine when the conditions of the zones are changing; digitizing and storing the changed conditions of the zones, and rendering a dynamic representation of the conditions of the zones.

In some embodiments, at least portions of the zone feature dataset and the event dataset are generated as layers and rendered or fused on a map platform or GIS overlay.

In some embodiments, at least a portion of the object tracking dataset is generated as a layer and rendered or fused on a map platform or GIS overlay.

In some embodiments, the objects include vehicles and the object-sensed conditions of the zones include an occupied state and a vacant state.

In some embodiments, the object-sensed conditions of the zones include zone surface-altering conditions, including the presence or otherwise of ice, snow or rain/water/spills.

In some embodiments, generating the zone feature dataset includes using static features including at least one of parking area signs and road markers, drop off and pick up area signs and road markers, off-street car parking spot signs and road markers, loading zone signs and road markers, public transport stop signs and road markers, traffic light zones or areas, petrol stations, or any other identified purpose-allocated zones where vehicles park or stop.

In some embodiments, the tracking data is used to determine when the objects change the condition or state of the zones by entering or exiting the zones.

In some embodiments, the tracking data associated with an object track is used to determine when the object changes the condition or state of a zone by determining when the track is terminating or beginning proximate the zone with the static and/or quasi-static zone identification features.

In some embodiments, the tracking data is passed through a semantics engine to make the determination.

In some embodiments, the method of generating a dynamic representation of a plurality of objects and associated zones in a geographic area further comprises rendering the dynamic digital representation of the conditions of the zones on a GIS overlay or map platform.

In some embodiments, the step of generating the object tracking dataset using the distributed fibre optic sensing network includes: repeatedly transmitting, at multiple instants, interrogating optical signals into each of one or more optical fibres distributed across the geographical area and forming at least part of a fibre-optic communications network; receiving, during an observation period following each of the multiple instants, returning optical signals scattered in a distributed manner over distance along the one or more of optical fibres, the scattering influenced by acoustic disturbances caused by the multiple objects within the observation period; demodulating acoustic data from the optical signals; and processing the acoustic data to identify tracks made by the objects over a period of time across the area.

In some embodiments, the step of generating the object tracking dataset using a distributed fibre optic sensing network further includes using beamforming techniques.

In some embodiments, the beamforming techniques include at least one of far field beamforming technique and near field beamforming technique.

In some embodiments, the one or more optical fibres are supplemented with dedicated or purpose-built trenches or pico-trenches to provide additional sensing coverage.

In some embodiments, identifying and classifying the associated zones in the area includes training the object-specific tracking data in a neural network.

In some embodiments, the object-specific tracking data is trained with non-acoustic sources of data in the neural network;

According to a second aspect of the disclosure there is provided a system for distributed fibre sensing configured to implement the method according to any of the preceding embodiments. The system may include: a light source; one or more optical fibres; a light receiver; and a processing unit.

According to a third aspect of the disclosure there is provided a system for generating a dynamic representation of a plurality of objects and associated zones in a geographic area, the system comprising: means for generating a zone feature dataset, including identifying and classifying the associated zones in the area, each zone being classified into a zone type based on static and/or quasi-static zone identification features and having at least two object-sensed conditions; means for generating an object tracking dataset, including tracking signals of at least some of the plurality of objects in the geographic area using a distributed fibre optic sensing network, and processing the tracking signals to obtain object-specific tracking data; means for generating an event dataset, including using the tracking data to determine when the conditions of the zones are changing; digitizing and storing the changed conditions of the zones, and means for rendering a dynamic representation of the conditions of the zones.

In some embodiments, the means for generating the object tracking dataset using the distributed fibre optic sensing network includes: a distributed sensing unit for repeatedly transmitting, at multiple instants, interrogating optical signals into each of one or more optical fibres distributed across the geographical area and forming at least part of a fibre-optic communications network, for receiving, during an observation period following each of the multiple instants, returning optical signals scattered in a distributed manner over distance along the one or more of optical fibres, the scattering influenced by acoustic disturbances caused by the multiple objects within the observation period, for demodulating acoustic data from the optical signals, and for processing the acoustic data to identify tracks made by the objects over a period of time across the area. In some embodiments, the one or more optical fibres are supplemented with dedicated or purpose-built trenches or pico-trenches to provide additional sensing coverage.

In some embodiments, the means for generating an event dataset includes a semantics engine.

In some embodiments, the semantics engine is configured to analyse the conditions of the zones that are not located entirely within the distributed fibre optic sensing network.

In some embodiments, the semantics engine is configured to disambiguate between the conditions of the zones. In some embodiments, the disambiguation is based on location of at least one of the plurality of objects relative to the at least one of the zones.

In some embodiments, the semantics engine is configured to analyse the tracking data including at least one trace with at least one of starting and end points and to identify at least one of the zones associated with the at least one of starting and end points.

In some embodiments, the semantics engine is configured to use information provided by a GIS overlay or map platform or other non-acoustic sources of data.

In some embodiments, the means for rendering the dynamic representation of the conditions of the zones includes a rendering engine.

Further aspects of the present invention and further embodiments of the aspects described in the preceding paragraphs will become apparent from the following description, given by way of example and with reference to the accompanying drawings.

DETAILED DESCRIPTION OF EMBODIMENTS

Figure 1A:
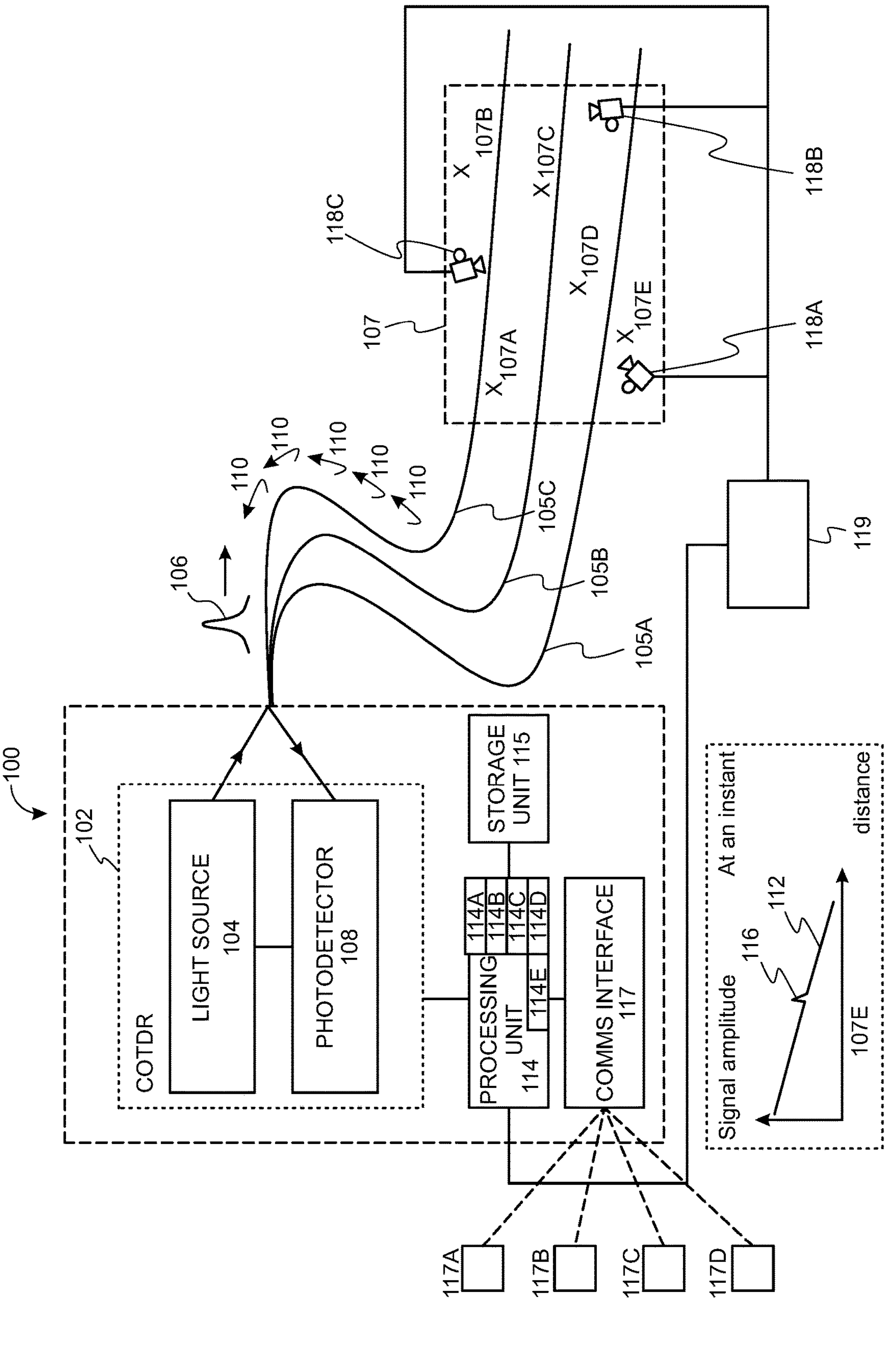
FIG. 1A illustrates an arrangement of a system for tracking acoustic objects.

The disclosed system and method make use of fibre optic sensing within a geographical area, such as a city, utilising an array of optical fibres distributed across the geographical area. A dynamic digital representation or map of objects and events in a zone is provided based on such sensing.

The inventor has recognised shortcomings associated with the viability of visual or radio monitoring techniques mentioned in the background, for example, for substantially total coverage of desired objects and events in a wide area. The present disclosure provides an alternative method and system to those techniques or systems mentioned in the background, and/or a supplemental method and system that can be used in conjunction with those techniques or systems.

In urban areas there are a number of static features such as car parks, bus stops and street signs that have properties that can be described using a finite state machine model of the area across a number of geospatially described zones, each zone representing at least one static feature of the area.

Tracks from objects, in particular the start and cessation of a track, can be interpreted in the context of static features of the area to determine real-time change of state of these static features such as the condition that a car parking spot just became occupied or unoccupied. Monitoring acoustic emissions in an area may therefore allow object type, tracks, events and states of static features of the area to be deduced and represented in a dynamic real-time digital model of the area. In one example, the dynamic real-time digital model of an area may be a dynamic digital map with moving objects, events and the state of static features being displayed in real time as symbols on a conventional map background with streets and locations.

Monitoring of acoustic events and/or objects facilitates determining the states of zones in the region of the acoustic events and therefore creating dynamic real-time representations of the zones. For example, the disclosed system and method may form a dynamic digital representation of one or more parking spaces to indicate in real-time that the parking space is vacant (digital representation "0") or the parking space is occupied (digital representation "1"). The dynamic real-time representations of the zones may be rendered on a Geographic Information System (GIS) overlay or map to provide a dynamic real time representation of the status of parking bays and areas in the zone. In the rendering process the digital representations may be correlated with suitable displayed images or symbols of, say a vehicle for a "1" and an empty bay for a "0". Further details will be provided in the following description.

Such a sensing technique relies on the occurrence of a nearby acoustic event causing a corresponding local perturbation of refractive index along an optical fibre. The required proximity of the acoustic event depends on noise floor of the sensing equipment, the background noise, and the acoustic properties of the medium or media between the acoustic event and the optical fibre. Due to the perturbed refractive index, an optical interrogation signal transmitted along an optical fibre and then backscattered in a distributed manner (e.g. via Rayleigh back scattering or other similar scattering phenomena) along the length of the fibre may manifest in fluctuations (e.g. in intensity and/or phase) over time in the reflected light. The magnitude of the fluctuations relates to the severity or proximity of the acoustic disturbance. The timing of the fluctuations along the distributed back-scattering time scale relates to the location of the acoustic event.

Reference to fibre optic sensing in this disclosure should be read as including any propagating wave or signal that imparts a detectable change in the optical properties of the sensing optical fibre, generally by inducing strain in the fibre and a resultant change in refractive index. These propagating signals detected in the system may include signal types in addition to acoustic signals such as seismic waves, vibrations, and slowly varying and very low frequency (DC-type) signals such as weight-induced compression waves that induce for example localised strain changes in the optical fibre. The fundamental sensing mechanism in one of the preferred embodiments is a result of the stress-optic effect but there are other sensing mechanisms in the fibre that this disclosure may exploit such as the thermo-optic effect and magneto-optic effect.

FIG. 1A illustrates an arrangement of a system 100 for use in distributed fibre sensing (DFS). The DFS system 100 includes a coherent optical time-domain reflectometer (C-OTDR) 102. The C-OTDR 102 includes a light source 104 to emit an optical interrogation field 106 in the form of an optical pulse to be sent into each of one or more optical fibres (e.g. 105A, 105B and 105C). The optical fibres 105A, 105B and 105C are distributed across a geographical area 107.

The C-OTDR 102 may include an optical circulator (not shown) configured to direct light from the light source 104 to each of the one or more optical fibres (e.g. 105A, 105B and 105C). The optical circulator also directs the back reflected light to a light receiver 108 included in the C-OTDR 102. It will be appreciated that other devices may be used for connecting the optical signal receiver and the optical fibre, including but not limited to optical couplers and array waveguide gratings.

Figure 1B:
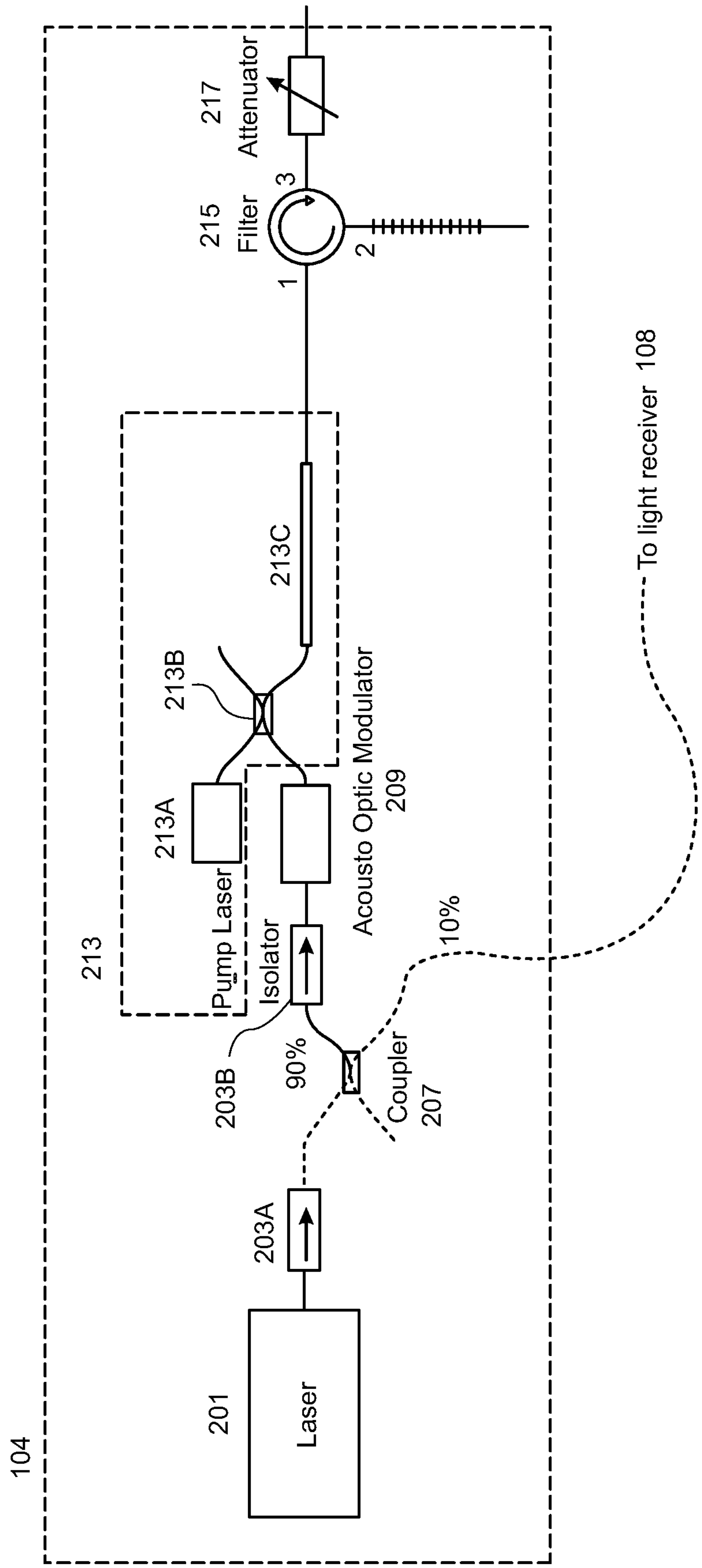
FIG. 1B illustrates a more detailed schematic view of an embodiment of a light source or optical transmitter forming part of the system of FIG. 1A.

FIG. 1B illustrates a more detailed arrangement of the light source or optical transmitter 104. The light source 104 includes a laser 201, for example, a distributed feedback laser (DFB), which directs a laser beam through a first isolator 203A. In one arrangement, a portion of light from the laser 201 is provided to the light/optical receiver 108 as a reference signal for processing purposes. For example, the light from the laser 201 may enter a 90/10 optical coupler 207, where 10% of the light is provided to the light receiver 108 via the direct path and the remaining portion (90%) of the light is provided to an acousto-optic modulator 209 via a second isolator 203B. The acousto-optic modulator 209 is configured to control the power, frequency, phase and/or spatial direction of light. Various types of modulators may be used, including but not limited to acousto-optic modulators and electro-optic modulators such as Lithium Niobate electro-optic modulators.

The modulated outgoing signal may then be provided to an optical amplifier 213, resulting in an overall amplification of the modulated signal to extend the reach of interrogation signals. While only one stage of the optical amplifier is illustrated, a multi-stage optical amplifier may be incorporated in other embodiments. In one example, the optical amplifier 213 may include an optical coupler 213B to couple a pump laser 213A with the modulated signal for Raman amplification with the transmission path. A photon-to-photon interaction between the pump wavelength and the signal wavelength occurs within the fibre, resulting in emission of a signal photon and thus providing amplification of the signal. In another example, the optical amplifier 213 may be an Erbium doped fibre amplifier (EDFA) comprising a pump source 213A, a coupler 213B and an optical fibre doped with a rare earth dopant such as Erbium 213C. The output of the optical amplifier 213 may be provided to an optical filter 215 to filter out the outgoing modulated signal. An optical attenuator 217 may be used to adjust the power of the outgoing light.

The light receiver 108 is configured to detect the reflected light 110 scattered in a distributed manner and produce a corresponding electrical signal 112 with an amplitude proportional to the reflected optical intensity resolved over time. The time scale may be translated to a distance scale relative to the light receiver 108. An inset in FIG. 1 illustrates a schematic plot of such signal amplitude over distance at one particular instant.

The DFS system 100 also includes a processing unit 114, within or separate from the C-OTDR 102, configured to process the fluctuations 116 in the electrical signal 112. These fluctuations are signals that contain a number of different frequencies at any one point and also along a series of different spatial points that the processing unit will convert to a digital representation of the nature and movement of the acoustic and other disturbances around the optical cable grid. In contrast to scalar measurands such as temperature (which typically do not provide any dynamic information above a few Hz, so it is not feasible to determine what type of heat sources are around the cable and how they are moving), acoustic signals contain a significant number of frequency components (which are unique and distinguishable to a specific target type) and vector information such as amplitude information and spatial information.

The digitised electrical signal 112, any measured fluctuations 116 and/or processed data associated therewith may be stored in a storage unit 115. The storage unit 115 may include volatile memory, such as random access memory (RAM) for the processing unit 114 to execute instructions, calculate, compute or otherwise process data. The storage unit 115 may further include non-volatile memory, such as one or more hard disk drives for the processing unit 114 to store data before or after signal-processing and/or for later retrieval. The processing unit 114 and storage unit 115 may be distributed across numerous physical units and may include remote storage and potentially remote processing, such as cloud storage, and cloud processing, in which case the processing unit 114 and storage unit 115 may be more generally defined as a cloud computing service. In addition or as an alternative to the raw or unfiltered acoustic data (i.e. acoustic data directly demodulated from the optical signals 110 without application of any acoustic signature-based filters) and other data derived from the fibre optic sensed signals being stored, optical signals 110 may be digitised by an A/D converter and stored as raw optical data (i.e. data derived from the optical signals which has not been demodulated into acoustic data).

The system 100 may include a communications interface 117 (e.g. wireless or wired) to receive a search request from one or more remote mobile or fixed terminals.

Figure 2A:
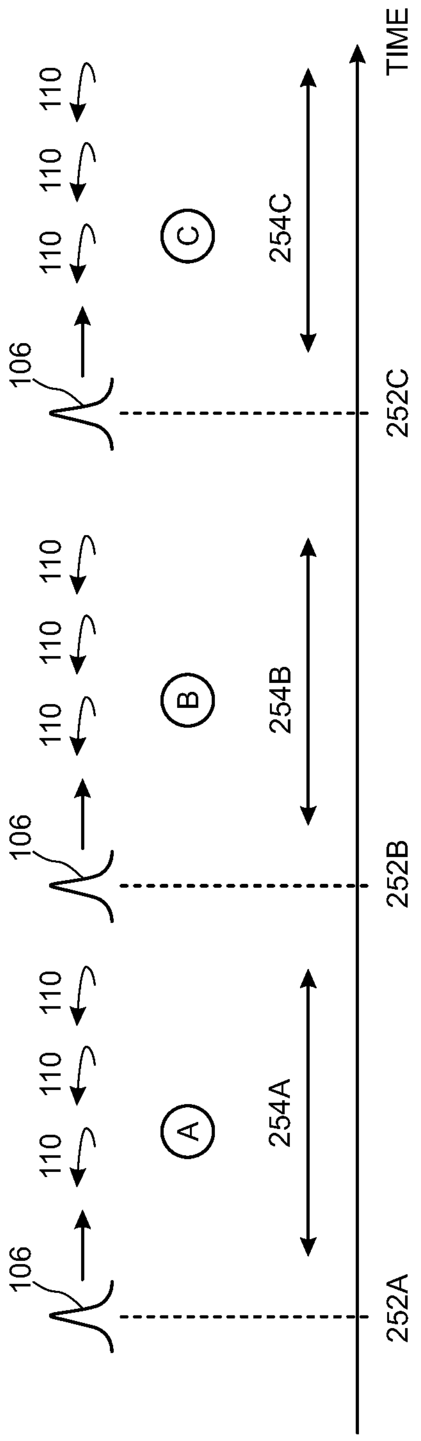
FIGS. 2A, 2B, 2C and 2D illustrate examples of methods of providing and processing acoustic data for tracking objects and for dynamically forming digital representations of zones associated with the tracked objects.
Figure 2B:
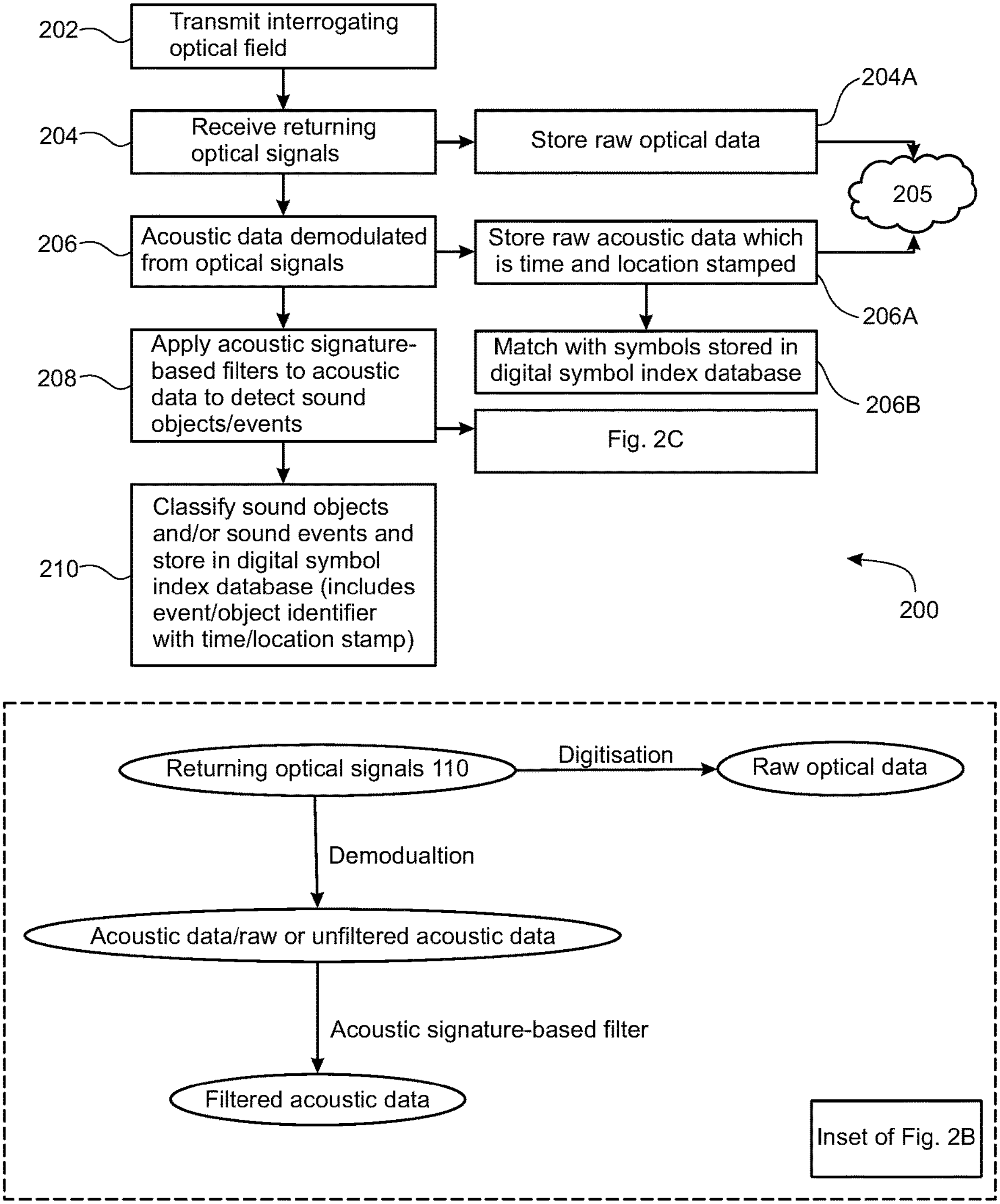

In FIGS. 2A and 2B a disclosed method 200 includes a step 202 of transmitting, at multiple time instants e.g. 252A, 252B and 252C as shown in FIG. 2A, interrogating optical signals or fields 106 into each of one or more optical fibres (e.g. one or more of 105A, 105B and 105C via a circulator) distributed across a geographical area (e.g. 107), which may typically be an urban environment. The optical fibres may form part of a public optical fibre telecommunications network which provides a high degree of dense street coverage (practically ubiquitous and at the very least co-extensive with the network). The optical fibres may also include fibres in dedicated or purpose-built pico-trenches to provide additional coverage. These may in turn connected up to a dark or repurposed fibre in the telecommunications network.

The disclosed method 200 also includes a step 204 of receiving, during an observation period (e.g. 254A, 254B and 254C in FIG. 2A) following each of the multiple time instants 252A, 252B and 252C, returning optical signals (e.g. 110) scattered in a distributed manner over distance along the one or more of optical fibres (e.g. one or more of 105A, 105B and 105C). This configuration permits determination of an acoustic signal (amplitude, frequency and phase) at every distance along the fibre-optic sensing cable. In one embodiment, the photodetector/receiver records the arrival time of the pulses of reflected light in order to determine the location and therefore the channel where the reflected light was generated along the fibre-optic sensing cable.

This configuration permits implementation of phased array processing and beamforming techniques. Beam forming through phased array processing of an ensemble of adjacent sensor channels is able to significantly extend the sensing range perpendicular to a given position along the fibre. Beamforming techniques can therefore be used to ensure the area that is covered by the sensing range of the optical cable network or grid has minimal gaps or areas where an acoustic source may not be detected.

One particular type of beamforming is referred to far field beamforming that may be applied for acoustic sources with planar wavefront arrival across the array, e.g. earthquakes. The far field beamforming forms laser beam-like patterns sensitive to arrival direction, which may be particularly useful for detection of arrival direction.

Alternatively and additionally, another particular type of beamforming technique referred to as near field beamforming may be implemented for cases where planar wavefront assumption of the acoustic source across the array does not hold, e.g. vehicles near to the optical fibre cables. The near field beamforming forms 2D areas of sensitivity offset from the optical fibre cables, wherein each 2D area corresponds to a different near field phase delay profile in the beam former. It will be appreciated that each 2D area that corresponds to a different near field phase delay profile in the beam former may be used not only for detecting acoustic source with spherical wavefronts in the near field but also for determining acoustic impedance of a material between an acoustic source and the optical fibre cable. For example, for cases where there are significant variations in the material surrounding the trench and cable, including rock, gravel, concrete, sand, water, earth, clay, bitumen or a combination of one of more of these, the acoustic/seismic transfer function that these materials form spatially between the fibre and the acoustic emission or vibration source of interest can be determined. Such transfer functions allow the heterogeneous media to be accounted for and so allow an accurate estimate of at least the spatial position, kinetics and the source frequencies present of any given perturbation around the optical fibre. The near field beamforming technique may also facilitate the sensing of high density objects and events near a one dimensional fibre optic cable, which may be particularly useful to isolate for example lanes on a multi-lane highway which are offset relative to the optical fibre sensing cable.

The implementation of far field and/or near field beamforming techniques may facilitate substantially total sensing area coverage of a particular urban area requiring monitoring, with or without supplementary dedicated pico-trenched fibres. Details of phased array processing and beamforming techniques are described in Applicant's PCT Application No. PCT/AU2017/051235, the entire contents of which are herein incorporated by reference.

The disclosed method 200 may also include a step 206 of demodulating acoustic data from the optical signals 110 associated with acoustic disturbances caused by the multiple targets detected within the observation period (e.g. 254A, 254B and 254C). At step 206A, raw or unfiltered acoustic data may be fed in parallel from demodulation step 206, digitised by an A/D converter, and stored in the storage unit 115, which may include cloud-based storage 205. The raw acoustic data is time and location stamped, so that it can be retrieved at a later stage to be matched at step 206B with symbols stored in a digital symbol index database for allowing additional detail to be extracted where possible to supplement the symbol data.

In addition or as an alternative to the raw acoustic data being stored, optical signals 110 without demodulation may be digitised by an analogue-to-digital (A/D) converter and stored as raw optical data at step 204A prior to demodulation in the storage unit 115, which may include cloud-based storage facility 205. In one embodiment, complete digital demodulation architectures may be implemented where the digitisation of the return signals is done early in the demodulation functions and most of the key demodulation functions are then carried out digitally (as opposed to using analogue hardware components) in high speed electronic circuits including FPGAs (field programmable gate arrays) and ASICs (application specific integrated (electronic) circuits). The acoustic data demodulated from the optical signals 110 may then be stored digitally which provides for greater flexibility than using a fixed analogue demodulator. While storing raw optical data may require substantially more storage capacity it may provide advantages of preserving the integrity of all of the backscattered optical signals without losing resolution as a result of signal processing steps like decimation and the like, and remaining all time and location based information. The stored raw optical data may then be retrieved for processing, re-processing and analysis at a later stage.

At step 208, acoustic signature-based filters (e.g. 114A, 114B, 114C and 114D as illustrated in FIG. 1) are applied to the acoustic data to detect and identify acoustic objects/events. These filters may be in the form of software-based FIR (finite impulse response) or correlation filters. Alternatively or additionally, classification may be implemented using AI and machine learning methodologies, based on feeding training data into neural networks, as will be described in more detail further on in the specification. An inset in FIG. 2B illustrates the relationship between optical signals, raw optical data, acoustic data/raw or unfiltered acoustic data and filtered acoustic data.

At step 210, symbols representative of sound objects and/or sound events are generated and stored in the digital symbol index database. Each symbol index includes an event/object identifier with time and location stamp. Event/object identifiers could include pedestrians, cars, trucks, excavators, trains, jackhammers, borers, mechanical diggers, manual digging, gunshots and the like. One of more different matched filters (e.g. software-based correlation filters 114A-114D) and/or machine learning techniques (e.g. deep learning architectures such as deep neural networks, deep belief networks, recurrent neural networks and convolutional neural networks) may be used as classification techniques for each classification type above (for example, each correlation filter is tuned to particular characteristics in the acoustic time series and acoustic frequency domain) and once the output of one of these software based filters reaches a threshold, a detection and classification object/event is triggered in the system. The system now has a digital representation of an object/event with properties such as what the object/event is, where it is located geographically, and how fast it is moving.

Figure 2C:
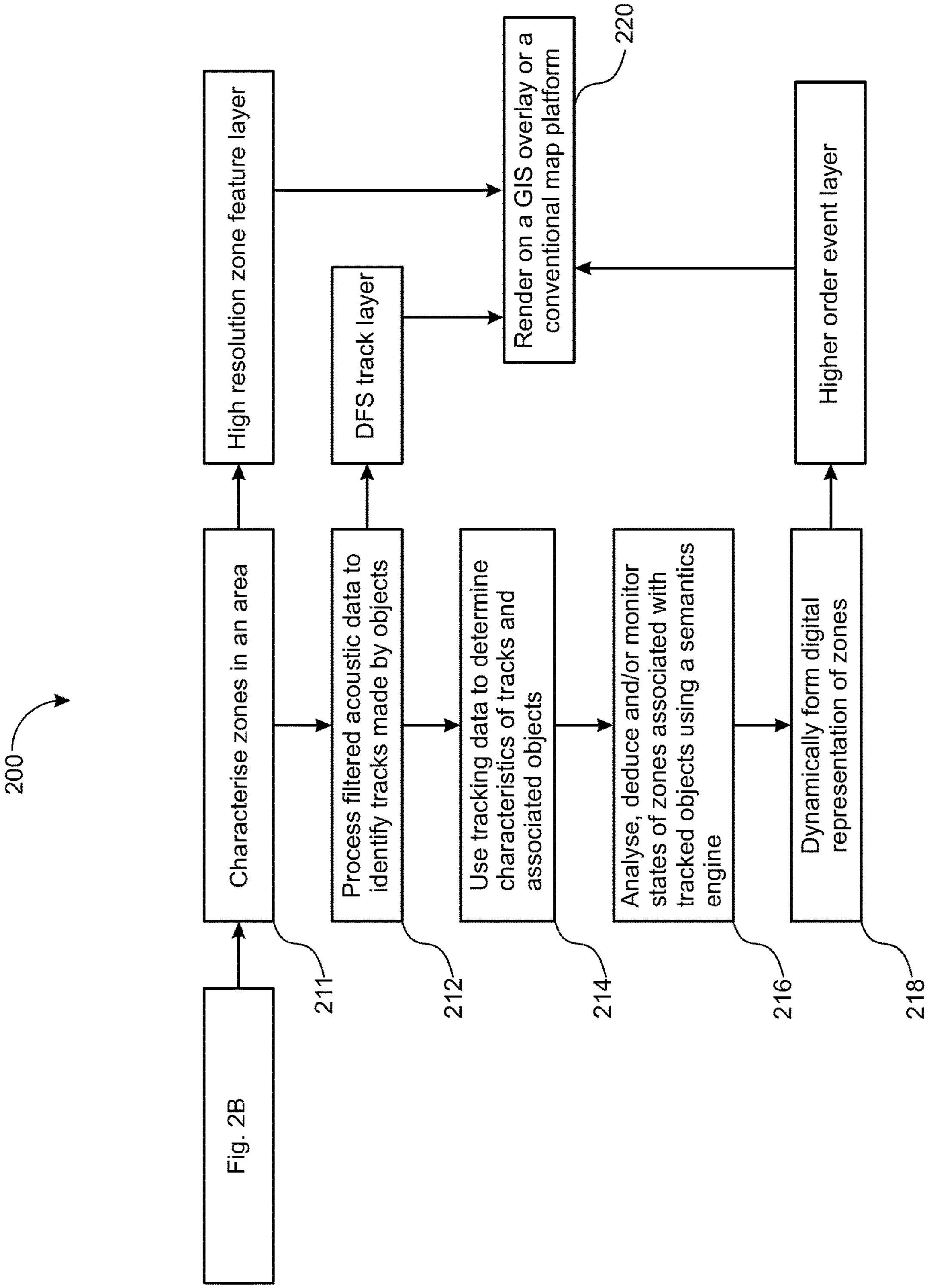
Figure 4A:
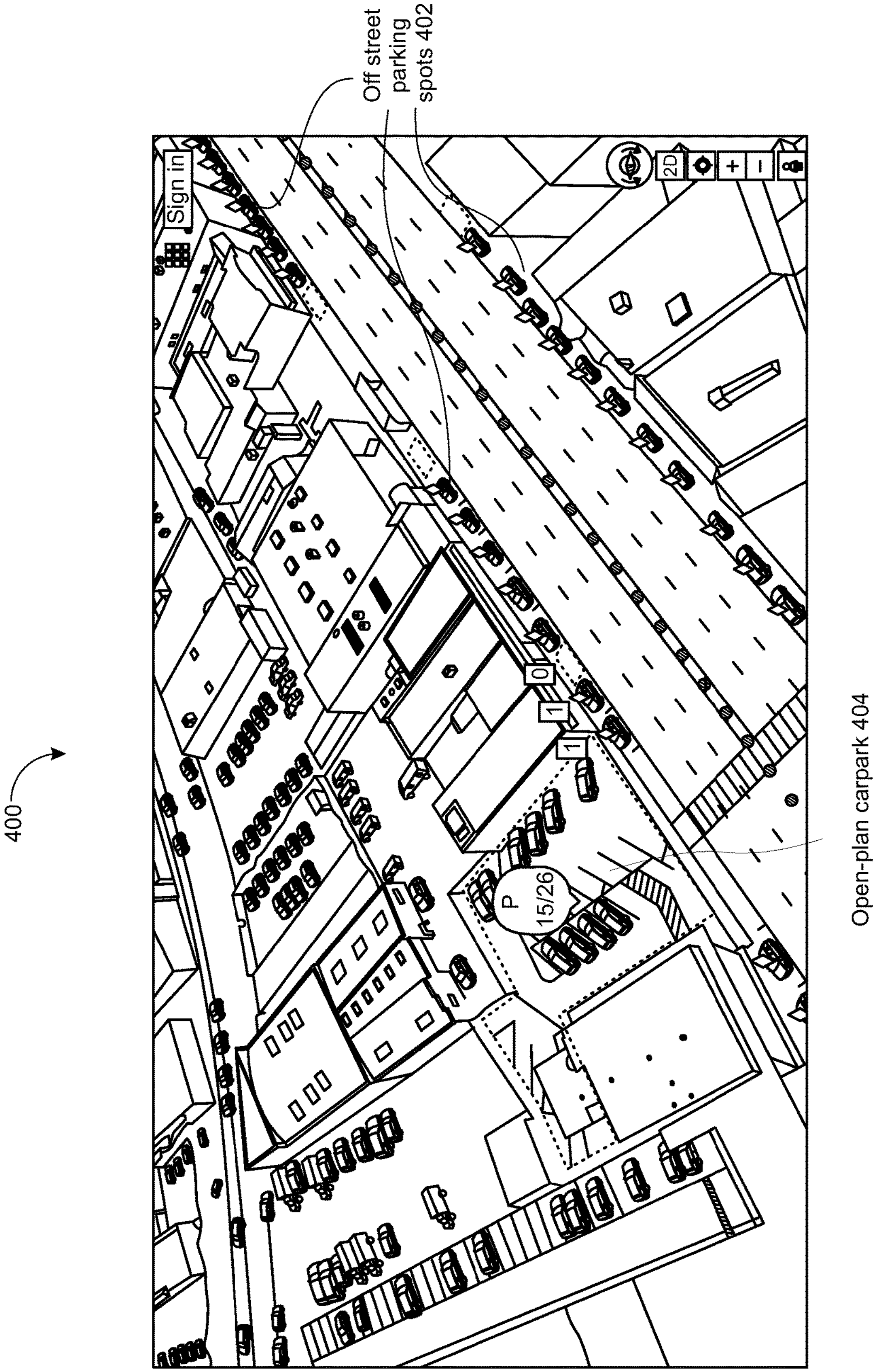
FIGS. 4A and 4B illustrate examples of zones and corresponding object-related states.
Figure 4B:
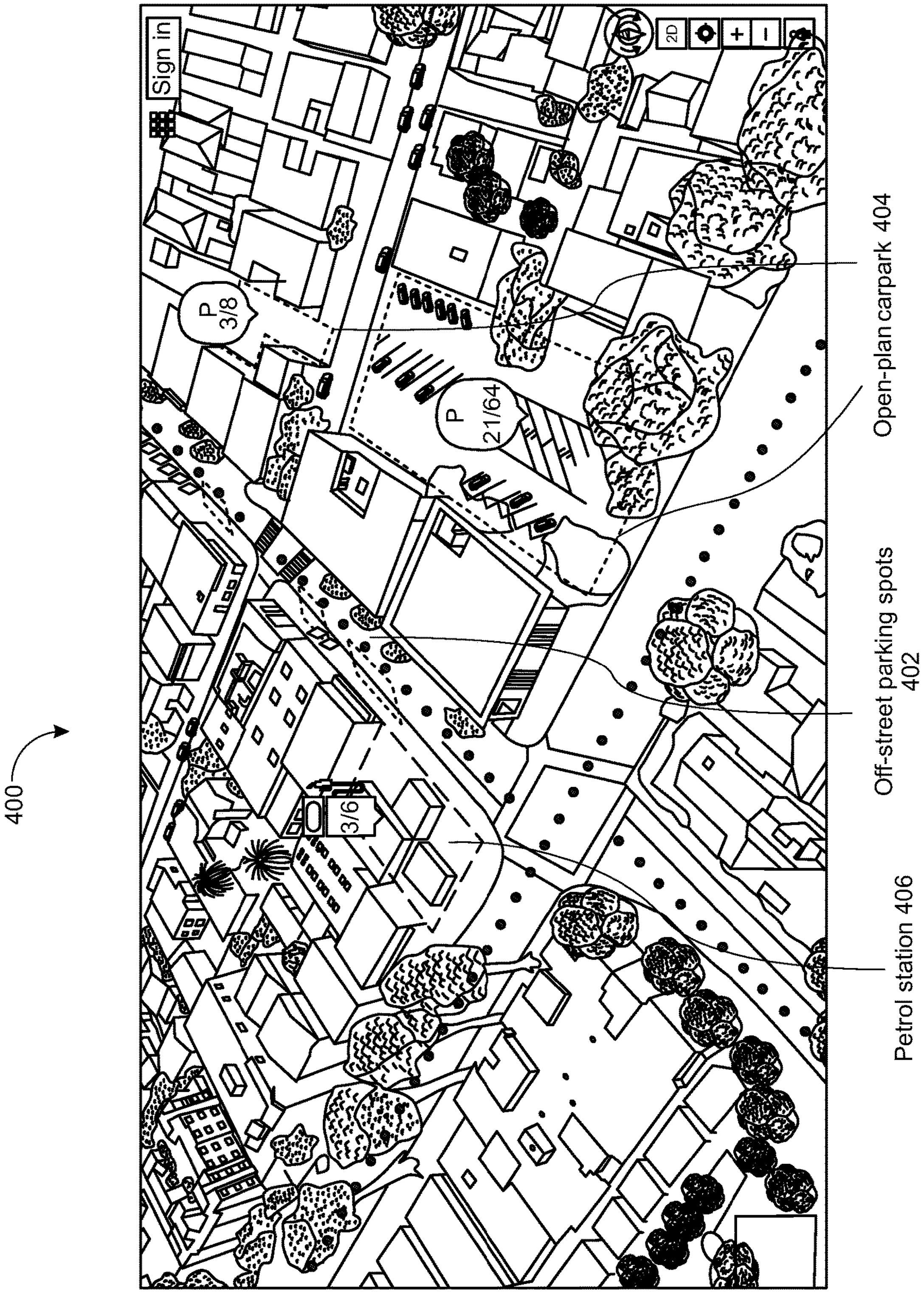

Referring now to FIG. 2C, the broad steps involved in a method of digitally mapping a geographic area will now be described. At step 211, the zones in the area may be identified and characterised or classified using a street view and/or bird's eye view of a mapping application such as Google® Maps. In another example, the zones in the area may be identified and classified using identified DFS traces obtained at step 212 trained together with other non-acoustic sources of data as discussed in FIG. 2D. The zones may include at least one of parking bays, parking areas, public transport stop or bays, loading zones, work zones, traffic light zones or areas, petrol stations or any other purpose-allocated zones where vehicles park or stop. Examples of these are shown in FIGS. 4A and 4B and will be described in more detail with reference to these figures.

At step 211, characterising or classifying zones in the area may include forming a 3D digital representation or map of static features (e.g. street signs, give way or yield signs, stop signs, no stopping signs, traffic lights, drop off and pick up area signs and road markers, warning signs, public transport stop signs and road markers, parking areas signs and road markers, off-street car parking spot signs and road markers, loading zone signs and road markers, petrol stations, or any other purpose-allocated zones where vehicles park or stop). The map may also include quasi-static or transient surface features which may be potentially hazardous or result in altered driving conditions such as the presence of rain/water, snow or ice. These are features which, whilst relatively static in comparison with moving objects such as vehicles or pedestrians, are transient or temporary.

Each zone is assigned a symbol, e.g. carpark, bus stop, parking spot entrance, stop sign or other road signs, puddle/water area, black ice area, etc. In addition to the zone identification and classification methods described above, identifying and classifying zones with quasi-static/transient features may be achieved by training the identified DFS traces obtained at step 212 so as to, for example, recognise differences in acoustic signatures of an ensemble of vehicles. The number of the ensemble of vehicles is large enough that the differences in average of these vehicle signatures are stable to infer changes locally in surface conditions of roads. The quasi-static features may indicate the surface conditions of roads in a zone including whether there is a presence of rain/water, snow and/or ice over the roads. The quasi-static zones over the roads that are acoustically derived as above may indicate start and stop sections with rain/water, snow or ice on the road surface.

Figure 2D:
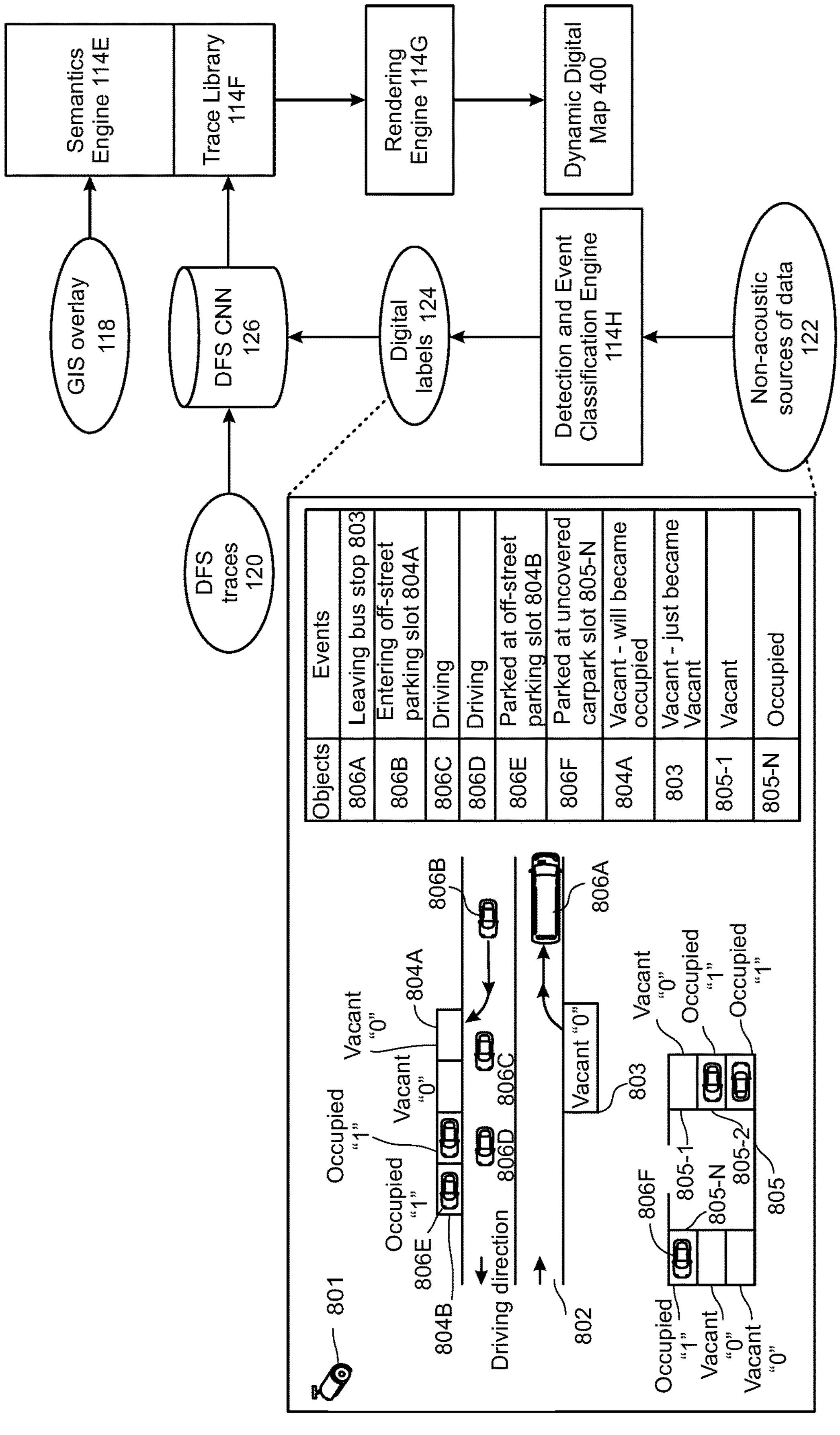
Figure 2E:
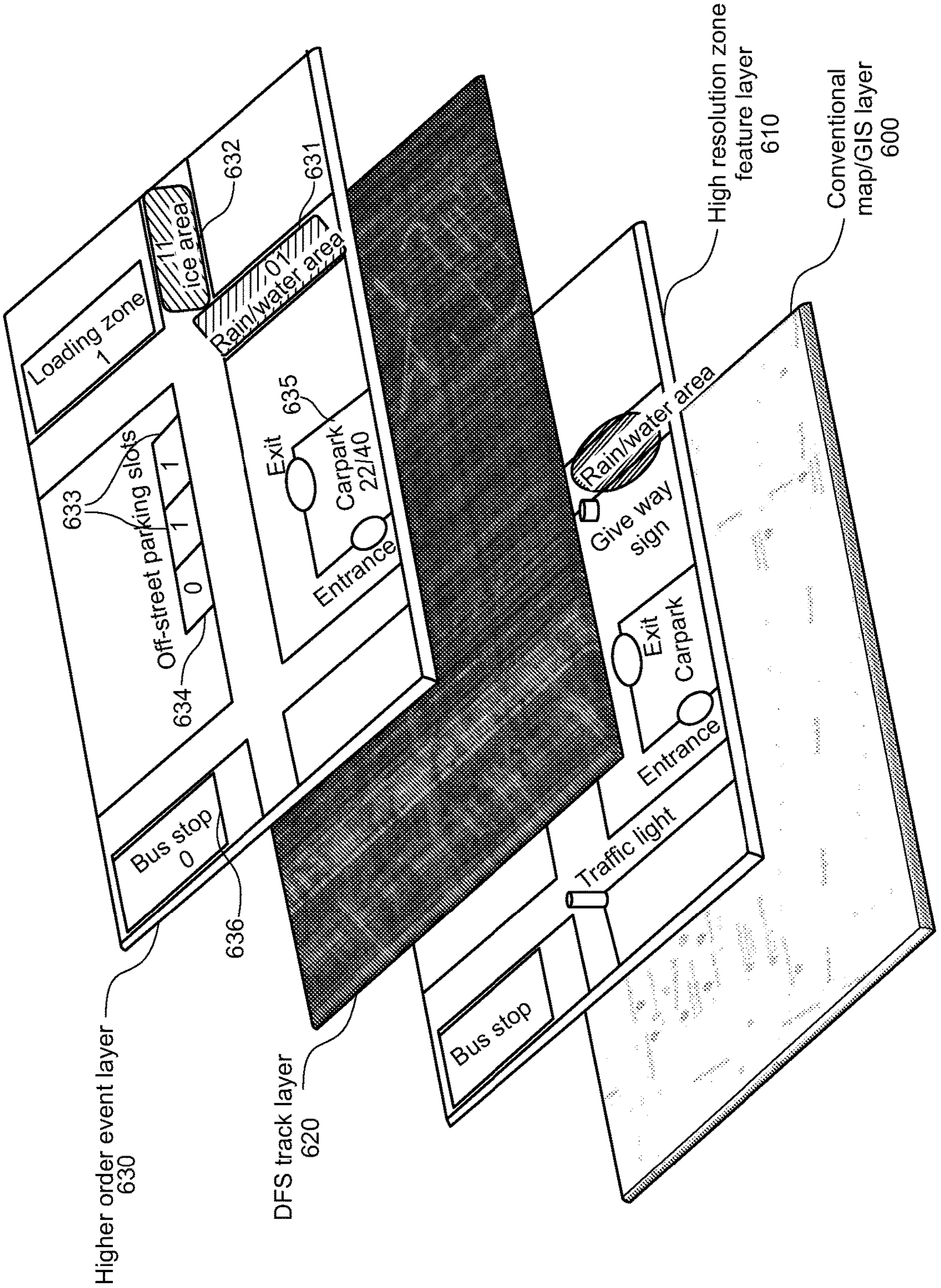
FIG. 2E shows a schematic view of the various layers generated and/or utilised in the dynamic digital representation of objects and events.

As illustrated in FIG. 2E, this 3D digital representation or map of static and/or quasi-static features may form a first layer (i.e. high resolution zone feature layer 610) that can be added to a GIS overlay or a conventional map layer 600 at step 220. In particular, the GIS overlay or conventional map layer 600 (e.g. Google® Maps) of an urban area has a layout of all streets, roads and highways and their names and street numbers of the lots of land adjacent to the streets and roads, which sets a fundamental topology of the urban area. The conventional map platform may also add businesses and institutions that are resident at the corresponding addresses to the fundamental topology.

At step 212, the filtered acoustic data derived from the DFS implementation illustrated in FIG. 2B is processed to identify tracking data, e.g. tracks made by objects with acoustic emissions (e.g. vehicles, pedestrians, trains, trams, etc.) in the area. At step 214, tracking data is used to determine characteristics associated with tracks and associated objects. For example, start and cessation points of the tracks are identified. The identified tracking data may also indicate characteristics of the objects, for example, speed, weight, path, acceleration, etc. In one example, the tracking data is used to determine a track is associated with a vehicle and to determine when and where the track is terminating or beginning. As illustrated in FIG. 2E, the tracking data in the form of the objects and/or their traces and/or their characteristics may form a second layer (i.e. DFS track layer 620) that can be added to the GIS overlay or the conventional map layer 600 at step 220.

At step 216, the states of zones are analysed, deduced/or and monitored using a semantics engine against the 3D representation or map of the static and/or quasi-static features generated at step 211. For example, the results from step 214 are analysed and the digital representations of the states are provided at step 218, for example, with a "1" denoting an occupied bay and a "0" denoting an unoccupied or empty bay, thereby forming a dynamic digital representation of the bays and other zones. The state of the quasi-static zones may be also described using digital representations, for example, with a "00" denoting a zone without presence of rain/water, snow or ice, a "01" denoting a zone with presence of rain/water, a "10" denoting a zone with presence of snow and a "11" denoting a zone with presence of ice, as is shown at 631 and 632 respectively in FIG. 2E. As illustrated in FIG. 2E, these digital representations indicating higher order events (e.g. off-street parking spots 633 occupied, off-street parking spot 634 vacant, uncovered carpark 635 occupied by 22 cars from a total of 40 car parking spaces, the same uncovered carpark occupancy increased by 1 from 22 to 23 in a total of 40 car parking spaces, bus stop 636 vacant, one pedestrian in rail corridor, etc.) may form a third layer (i.e. higher order event layer 630) that can be added to the GIS overlay and the conventional map layer 600 at step 220. It should be noted that the layers shown in FIG. 2E are for illustrative purposes only and the contents shown on each layer do not necessarily align with one another.

With the three layers (i.e. high resolution zone feature layer 610, DFS track layer 620 and higher order event layer 630) fused and added to the conventional map at step 220, a dynamic real-time representations of zones can be provided for use by drivers and pedestrians in the area, traffic authorities, town planners, traffic engineers, toll road operators, road maintenance authorities and the like.

Figure 3A:
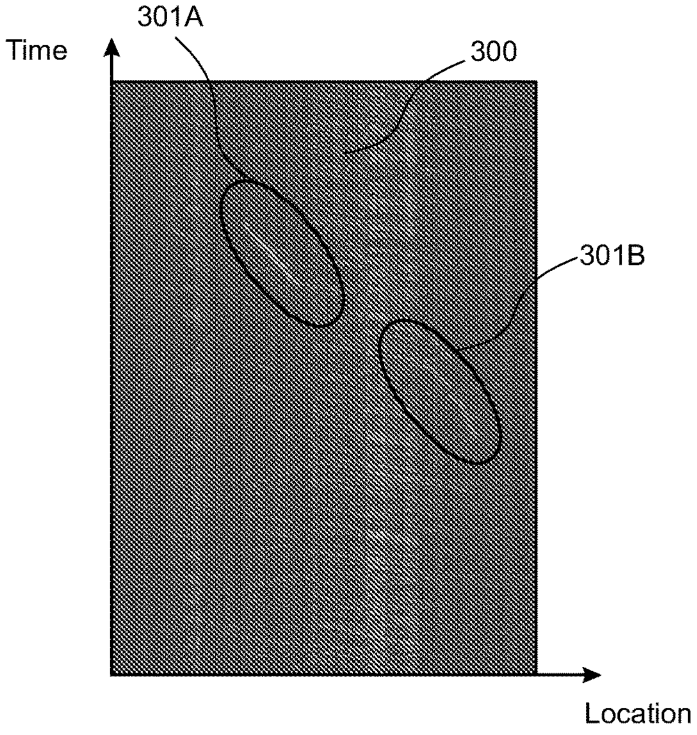
FIGS. 3A and 3B illustrate examples of density plots of electrical signals generated by the system.
Figure 3B:
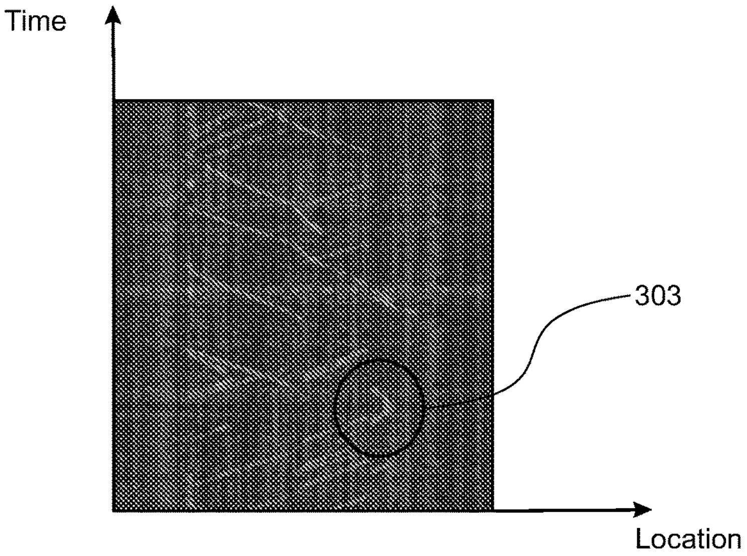

FIGS. 3A and 3B illustrate examples of density plots of electrical signals generated by the system 100 over time. Features such as traces of straight lines with relatively constant gradients 300 are associated with objects moving at a relatively constant speed (with the gradients being indicative of speed) that cause the relevant acoustic events detected by the system 100. FIG. 3A also shows traces 301A and 301B of a slow moving object against background traffic, which is observed as a garbage truck at speed of 3 km/h. In another example, FIG. 3B provides a trace 303 of a car performing a U-turn slowly. The traces 301A, 301B and 303 may correspond to signals in a low frequency band such as the 0-2 Hz so-called DC band, the detection of which is discussed in more detail in Applicant's PCT Application No. PCT/AU2019/051249, the entire contents of which are herein incorporated by reference, and an extract of which is set out below for ease of reference. It will be appreciated that in the case of slow moving vehicles that are in the process of parking low frequency band detection will be applicable in many cases.

The DC-type band indicates direct strain on the cable which is related to the gross weight induced changes in the region above the fibre optic cable and as a function of product of weight and proximity of the vehicle from the cable. While the DC band has significantly lower signal amplitude for the vehicle there are virtually no other local ambient sound sources in this frequency band to introduce noise and hence to degrade the detection performance. This is in contrast to the higher frequency bands of 10-90 Hz for example where there is a significant amount of ambient noise, which will tend to mask the higher frequency signal even though it is greater in amplitude.

This may result in a higher signal to noise ratio (SNR) for moving object detection in DC-type band compared to higher frequency AC-type bands, despite the average signal amplitude being lower in the DC band. Whilst it would be appreciated by the person skilled in the art that the DC-type band may be used for object tracking against high noise clutter in the higher frequency bands, this is counterintuitive in the sense that there is no motivation up front to identify and isolate a lower frequency signal with a substantially lower amplitude. It will be appreciated that the terms AC and DC are borrowed from electrical engineering terminology and relate to whether the current is constant or alternating and thus the frequency content of DC asymptotically approaches zero, generally 0-2 Hz, and that of AC is >2 Hz, typically >40 Hz but may be less (down to 10 Hz or even less for low frequency acoustic signals).

The DC frequency range is set considering the signals in this band originate from the movement of the weight of an object over the cable. As such the frequency of the signal is the inverse of the period of time a vehicle for example takes to traverse a given DAS channel. If for example we assume a 10 m channel width then at 60 km/h the time it takes for the object to pass is 0.6 s, and the corresponding frequency range is in turn of the order <2 Hz.

A semantics or context engine 114E may be included in the processing unit 114. In one example, the semantics engine 114E is used to identify and resolve situations where tracking of one or more objects such as vehicles or pedestrians is suspended or ambiguated. This may occur as result of pedestrians or vehicles slowing down or stopping. In this case the acoustic footprints of the pedestrians or vehicles may merge and may also reduce in amplitude as the pedestrians or vehicles decelerate and then stop, as is the case with vehicles at a traffic light or in heavy traffic conditions, or in the case of vehicles parking. The semantics engine is configured to disambiguate between these conditions based on the location of the vehicle relative to a parking bay or traffic light for example, using the GIS overlay and the vehicle coordinates relative to the overlay.

Tracking may also be ambiguated or suspended as a result of acoustic objects temporarily no longer being acoustically detected, including pedestrians or vehicles moving away from network coverage, by for example travelling along a street or laneway that is not provided with a fibre optic cable, or utilising off-street parking that is out of the detection range of a fibre optic cable. In general terms, the semantics engine is configured to reactivate the tracking by assessing and comparing pre- and post-non-detection conditions based on at least one of acoustic signatures, displacement, velocity or acceleration profiles, and geographic location based on GIS/map overlay.

More specifically, the semantics engine may be used to analyse states of zones associated with tracked vehicles at step 216. As noted, the zones may not be located entirely within the fibre-optic sensing network, with the result that the status of the zones needs to be inferred based on traces ending or commencing adjacent the zones. It will be appreciated that significant variations in such tracks will arise as a result of the location and depth of the fibre optic cables, the vehicle type, parking protocols, and vehicle speed amongst other variables. As illustrated in FIG. 2D, the identified DFS traces 120 made by the vehicles at step 212, may be integrated with other non-acoustic sources of data 122, for example, CCTV cameras, to provide training data for a DAS or DFS neural network 126 (e.g. convolutional neural network (CNN)) correlating images of vehicles parking with their corresponding traces at various locations corresponding to different parking zones, including edge cases.

In one example, the non-acoustic sources of data 122, for example, data from CCTV cameras, are connected to an object and event detection and classification engine 114H. As illustrated in the inset of FIG. 2D, a camera 801 monitoring a test zone including streets (e.g. 802), bus stops (e.g. 803), off-street parking spots (e.g. 804A and 804B) and uncovered carpark (e.g. 805) with parking slots (e.g. 805-1, 805-2, . . . , 805-N) captures images and/or videos including objects (e.g. vehicles including bus 806A and other vehicles 806B-806F and parking spots) and events (e.g. driving, entering a parking spot, leaving a parking spot, etc.). The captured images and/or videos are sent to the object and event detection and classification engine 114H that can generate a reliable set of digital labels 124 for the objects and events in the test zone as shown in the table in the inset. These labelled objects and events 124, as well as the corresponding DFS traces 120 obtained from the step 212 in the test zone are then sent to the DAS CNN 126 for training. The resultant neural network can be used to reliably recognise parking traces, which may then be integrated with the GIS overlay 118 at the semantics engine 114E and/or street views functions supported by mapping application (e.g. Google® Maps) as illustrated in FIGS. 4A and 4B.

As previously noted the zones may be parking bays, parking areas, public transport stops or bays, loading zones, traffic light zones or areas, petrol stations, or any other purpose-allocated zones where vehicles park or stop. The object-related states of such zones may be identified as occupied or non-occupied as for example illustrated in FIGS. 4A and 4B for off-street parking spots 402 or the number of sub-zones of a zone that are occupied or non-occupied as for example illustrated in FIGS. 4A and/or 4B for open-plan carparks 404 and petrol stations 406.

Figure 5A:
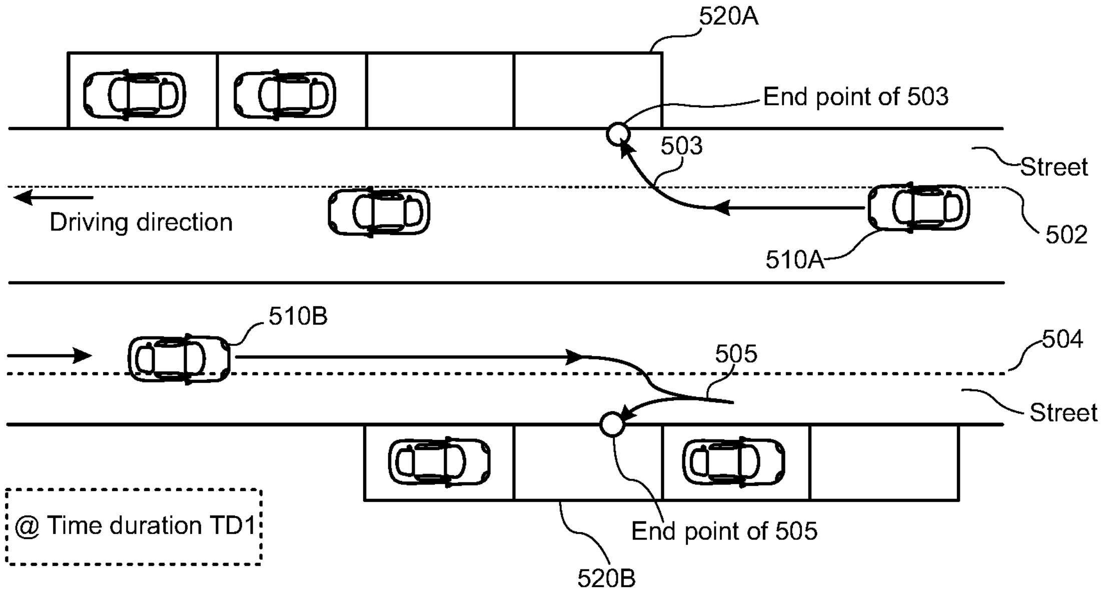
FIGS. 5A and 5B illustrate an example of a zone identified as an off-street parking spot with exemplary vehicle traces associated with the off-street parking spots over a first time duration and a second time duration, respectively.

In one example, the zone is identified as an off-street parking spot without coverage by the fibre-optic sensing network as illustrated in FIG. 5A, where a fibre-optic cable is out of detection range of the parking spots 520A and 520B. FIG. 5A also shows examples of the vehicle traces (i.e. 503 and 505) detected, identified and recorded over a first time duration (i.e. TD1) against distance along a street overlying the fibre optic segments 502 and 504 by processing the filtered acoustic data over TD1. Optical distance may be accurately mapped and correlated with the physical location of the optical fibre and geographical coordinates which may include street addresses. The semantics engine may analyse the detected traces including starting and/or end points (i.e. beginning or termination of a trace) and identify the zone associated with the traces including starting and/or end points.

Figure 5B:
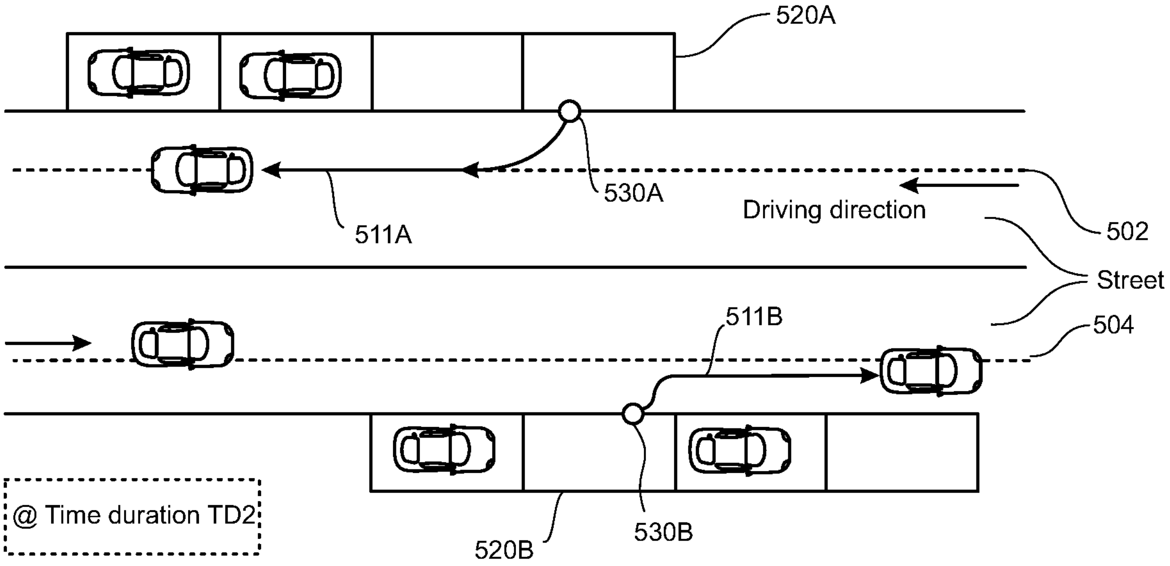

As noted, the positions of the start points and end points of the traces may be dependent on the detection range of the corresponding fibre optic cable. In this example as illustrated in FIG. 5A, based on the trace 503 overlying fibre optic cable 502, the semantics engine may determine that a vehicle 510A would be parked at off-street parking spot 520A and based on the trace 505 overlying fibre optic cable 504 a vehicle 510B would be parked at off-street parking spot 520B. In another example where the traces are not identified with the corresponding objects, the semantics engine may simply determine that off-street parking spots 520A and 520B would be occupied. FIG. 5B shows examples of the vehicle traces (i.e. 511A and 511B) detected, identified and recorded over a second time duration (i.e. TD2). Based on the detected traces and the corresponding start points of the traces (530A for trace 511A and 530B for trace 511B), as well as the recorded previously occupied status of the spots 520A and 520B, the semantics engine may determine that off-street parking spots 520A and 520B would be vacant.

At step 218, digital representations of the off-street parking spots (e.g. off-street parking spots 520A and 520B) may be dynamically formed based on the determination of the state of the off-street parking spot. For example, the vacant state of the off-street parking spot may be indicated as digital representation "0") and the occupied state of the off-street parking spot may be indicated as digital representation "1".

Figure 6A:
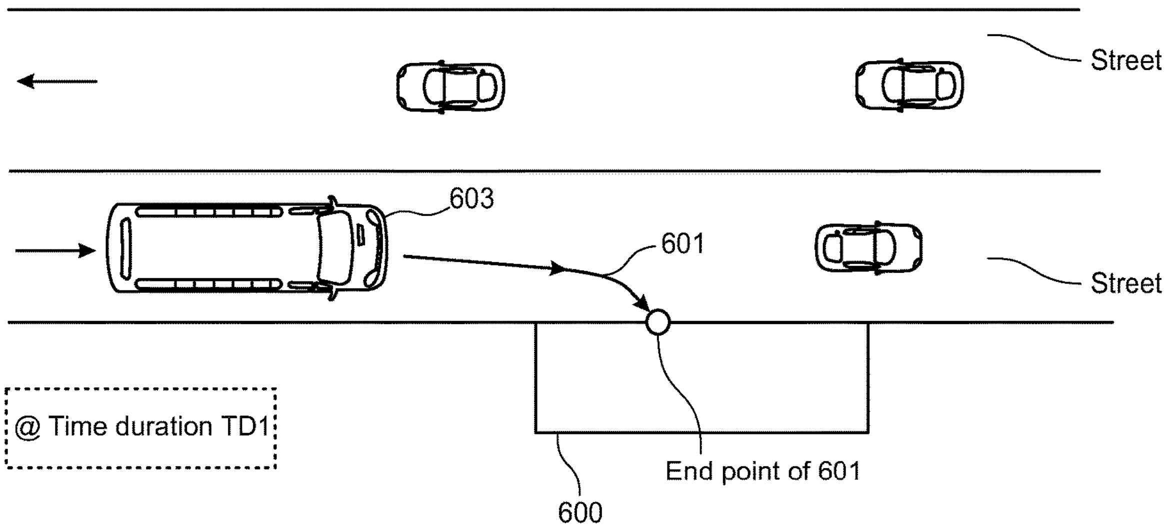
FIGS. 6A and 6B illustrate an example of a zone identified as a bus stop with exemplary vehicle traces associated with the bus stop over a first time duration and a second time duration, respectively.
Figure 6B:
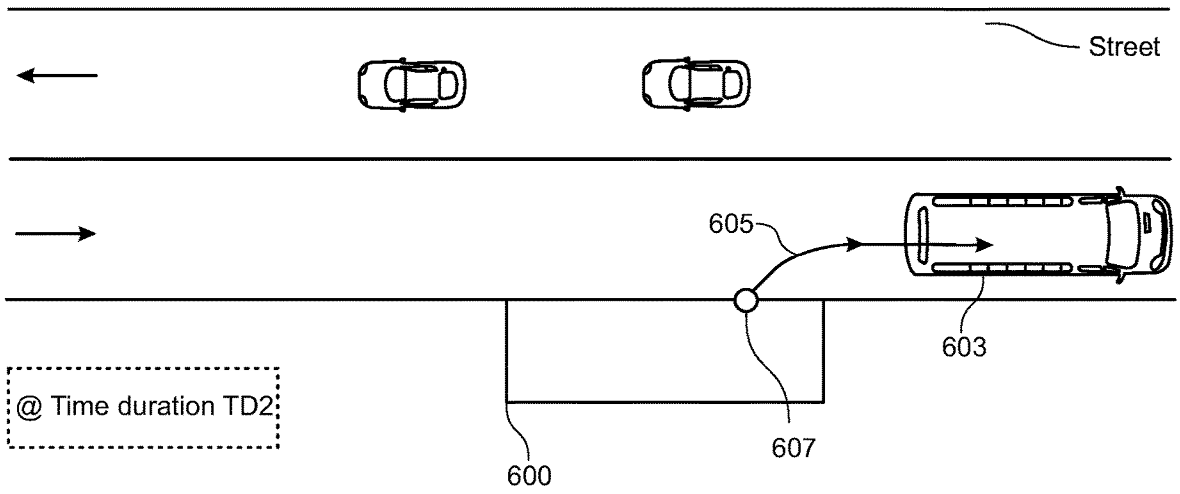

In another example, a zone is identified as a bus stop 600 without coverage by the fibre-optic sensing network as illustrated in FIG. 6A. FIG. 6A also shows an example of the vehicle trace (i.e. 601) detected, identified and recorded over a first time duration (i.e. TD1) against distance along a street overlying the fibre optic segment by processing the filtered acoustic data over TD1. The semantics engine may determine that a bus 603 would be parked at the bus stop 600, based both on the location of the trace and the signature of the trace being associated with a bus and not a vehicle. In another example where the traces are not correlated to the corresponding objects, the semantics engine may simply determine that the bus stop 600 would be occupied. FIG. 6B shows an example of a trace 605 detected, identified and recorded over a second time duration (i.e. TD2). Based on the detected traces (e.g. 605) and the corresponding start points of the traces (e.g. 607), the semantics engine may determine that the bus stop 600 would be vacant. Similarly, a digital representation of the bus stop may be dynamically formed based on the identified associated states (e.g. "0" for vacant and "1" for occupied). The digital representation may include additional information if not merely using a single binary digit. For example, 0 or 00 could indicate the vacant bus stop, 11 could indicate the presence of a bus, and 01 or 10 the presence of another vehicle.

Figure 7A:
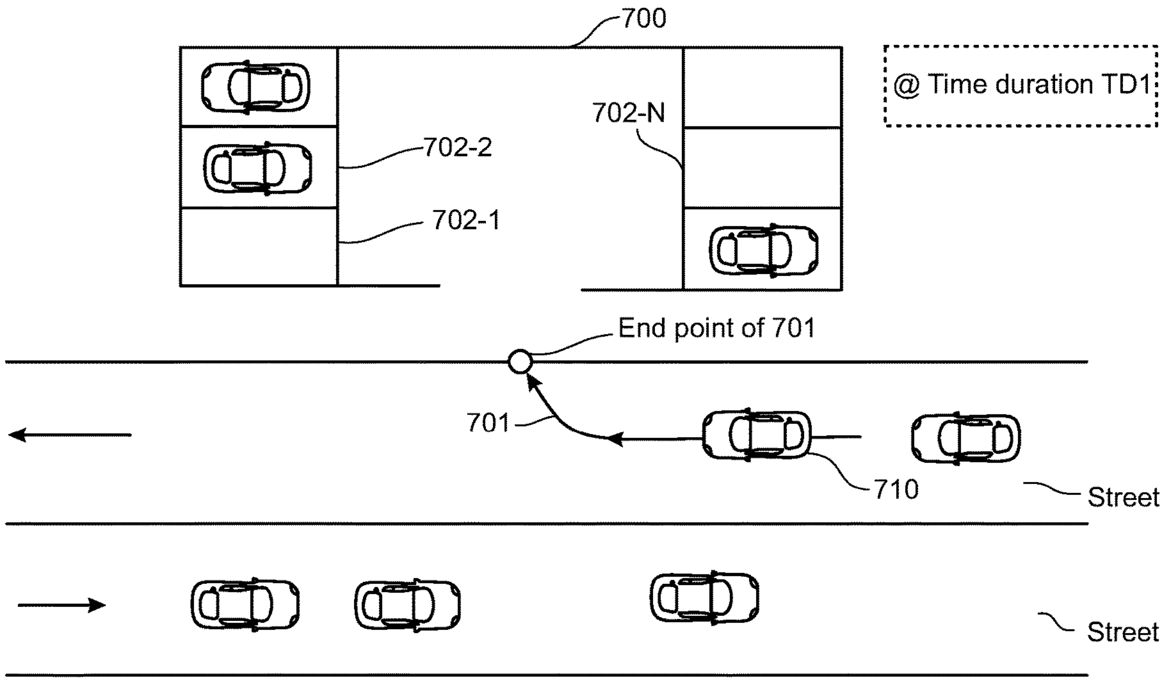
FIGS. 7A and 7B illustrate an example of a zone identified as an open-plan carpark/petrol station with exemplary vehicle traces associated with the open-plan carpark/petrol station over a first time duration and a second time duration, respectively.

In yet another example, a zone is identified as an open-plan carpark or a petrol station (i.e. 700) without coverage by the fibre-optic sensing network as illustrated in FIG. 7A. The number of service spots (i.e. sub-zones) within the zone may be identified through other non-acoustic sources of data (e.g. street views). In this example, the total number of the sub-zones (702-1, 702-2, . . . , 702-N) is identified as six, which may be represented using a binary string (i.e. 110). The initial state of the zone (e.g. the initial number of occupied sub-zones) at a time instant T1 may be determined by other non-acoustic sources of data (e.g. street views). In this example, three (011 in binary number) sub-zones are initially identified as occupied.

FIG. 7A also shows an examples of the vehicle trace (i.e. 701) detected, identified and recorded over a first time duration from T1 (i.e. TD1) against distance along a street overlying the fibre optic segment by processing the filtered acoustic data over TD1. Optical distance may be accurately mapped and correlated with the physical location of the optical fibre and geographical coordinates which may include street addresses. The semantics engine may analyse the detected traces including starting and/or end points (i.e. beginning or termination of a trace) and identify the zone associated with the traces including starting and/or end points. In this example as illustrated in FIG. 7A, the semantics engine may determine that vehicle 710 would enter into the open-plan carpark/petrol station. In another example where the traces are not correlated to the corresponding objects, the semantics engine may simply determine that one more service spots of the open-plan carpark/petrol station 700 would be occupied. Accordingly, the semantics engine may increment the state of this open-plan carpark/petrol station 700 from 011 to 100 indicating that 4 out of 6 service spots are occupied for this open-plan carpark/petrol station 700.

Figure 7B:
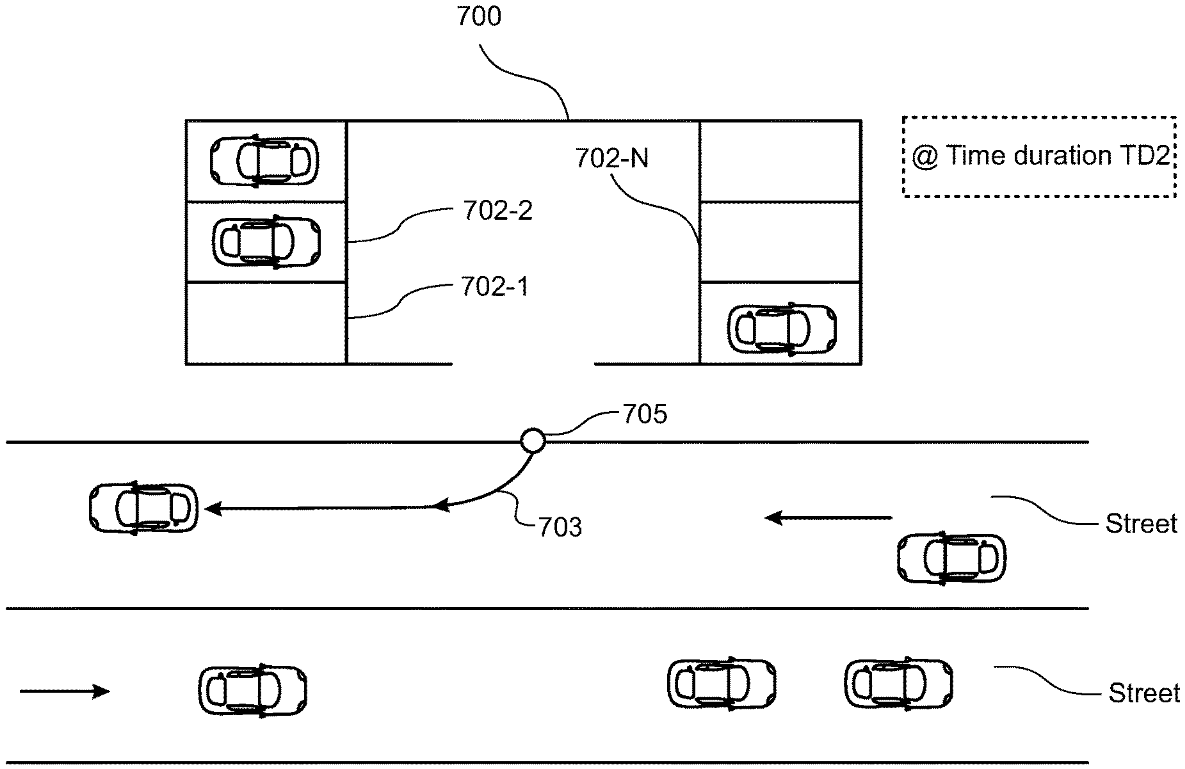

FIG. 7B shows another example of vehicle trace (i.e. 703) detected, identified and recorded over a second time duration (i.e. TD2). Similarly, based on the detected traces (e.g. 703) and the corresponding start points of the traces (e.g. 705), the semantics engine may decrease the state of this open-plan carpark/petrol station from 100 to 011 indicating that 3 out of 6 service spots are occupied for this open-plan carpark/petrol station 700.

At step 222, as for example illustrated in FIGS. 4A and 4B, the real time states of zones as dynamically identified may be rendered and updated on a GIS overlay 118 or a map through a rendering engine 114G as illustrated in FIG. 2D to form a dynamic digital map 400. The real time rendering step may include correlating the digital indicators with symbols or notifications (eg "1" on occupied bay with a vehicle image, "1" on a bus stop with a bus image, 100 to 011 with regard to an open-plan carpark with a notification "3 parking bays available" or simply P21/64). FIGS. 4A and 4B show examples of such rendering with off street parking spots 402 where the "110" digital indication corresponds to a representation of two occupied and one unoccupied bay respectively, open plan carparks 404 (P15/26 and P21/64) and petrol station 406.

In addition the time which a vehicle remains in a parking bay may also be monitored and recorded for the benefit of traffic authorities where for example there is a parking bay having a particular associated time limit.

It would be appreciated by the person skilled in the art that the present disclosure provides a feasible method and system to facilitate forming dynamic real time representation of zones that are associated with trackable objects. As an example, it might be useful or at least an alternative to provide real-time parking information of off-street parking spots and open-plan parking area and real-time service availability of bus stops and petrol stations.

It will be understood that the invention disclosed and defined in this specification extends to all alternative combinations of two or more of the individual features mentioned or evident from the text, examples or drawings. All of these different combinations constitute various alternatives of the present disclosure.

The invention claimed is:

1. A method of generating a dynamic representation of a plurality of objects and associated zones in a geographic area, the method comprising:
- generating a zone feature dataset, including:
  - identifying and classifying the associated zones in the geographic area, each zone being classified into a zone type based on static and/or quasi-static zone identification features and having at least two object-sensed conditions;
- generating an object tracking dataset, including:
  - tracking signals of at least some of the plurality of objects in the geographic area using a distributed fibre optic sensing network, and
  - processing the tracking signals to obtain object-specific tracking data;
- generating an event dataset, including:
  - isolating a DC-band strain signal from the distributed fibre optic sensing network, the DC-band strain signal being indicative of gross weight-induced changes in a region above a fibre optic cable, using appearance or disappearance of the DC-band strain signal, and tracking data to determine when conditions of the zones are changing as a result of an object entering or exiting a zone; and
  - digitizing and storing the conditions of the zones; and
- rendering a dynamic representation of the conditions of the zones.

2. The method of claim 1 wherein at least portions of the zone feature dataset and the event dataset are generated as layers and rendered or fused on a map platform or GIS overlay.

3. The method of claim 1 wherein at least a portion of the object tracking dataset is generated as a layer and rendered or fused on a map platform or GIS overlay.

4. The method of claim 1 wherein the objects include vehicles and the object-sensed conditions of the zones include an occupied state and a vacant state.

5. The method of claim 1 wherein the object-sensed conditions of the zones include zone surface-altering conditions, including a presence or otherwise of ice, snow or rain/water/spills.

6. The method of claim 1 wherein generating the zone feature dataset includes using the static and/or quasi-static zone identification features including at least one of parking area signs and road markers, drop off and pick up area signs and road markers, off-street car parking spot signs and road markers, loading zone signs and road markers, public transport stop signs and road markers, traffic light zones or areas, and petrol stations.

7. The method of claim 1 wherein the tracking data is used to determine when the objects change the condition or state of the zones by entering or exiting the zones.

8. The method of claim 1 wherein the tracking data associated with an object track is used to determine when the object changes the condition or state of a zone by determining when the track is terminating or beginning proximate the zone with the static and/or quasi-static zone identification features.

9. The method of claim 1 wherein the tracking data is passed through a semantics engine to make the determination.

10. The method of claim 1 further comprising:

rendering the dynamic representation of the conditions of the zones on a GIS overlay or map platform.

11. The method of claim 1 wherein the step of generating the object tracking dataset using the distributed fibre optic sensing network includes:

repeatedly transmitting, at multiple instants, interrogating optical signals into each of one or more optical fibres distributed across the geographical area and forming at least part of a fibre-optic communications network;

receiving, during an observation period following each of the multiple instants, returning optical signals scattered in a distributed manner over distance along the one or more of optical fibres, wherein scattering of the optical signals is influenced by acoustic disturbances caused by multiple objects within the observation period;

demodulating acoustic data from the optical signals; and processing the acoustic data to identify tracks made by the objects over a period of time across the geographic area.

12. The method of claim 11 wherein the step of generating the object tracking dataset using the distributed fibre optic sensing network further includes using beamforming techniques.

13. The method of claim 12 wherein the beamforming techniques include at least one of a far field beamforming technique and near field beamforming technique.

14. The method of claim 11 wherein the one or more optical fibres are supplemented with dedicated or purpose-built trenches or pico-trenches to provide additional sensing coverage.

15. The method of claim 1 wherein identifying and classifying the associated zones in the geographic area includes training the object-specific tracking data in a neural network.

16. The method of claim 15 wherein the object-specific tracking data is trained with non-acoustic sources of data in the neural network.

17. A system for generating a dynamic representation of a plurality of objects and associated zones in a geographic area, the system comprising:

means for generating a zone feature dataset, including:

identifying and classifying the associated zones in the geographic area, each zone being classified into a zone type based on static and/or quasi-static zone identification features and having at least two object-sensed conditions;

means for generating an object tracking dataset, including:

tracking signals of at least some of the plurality of objects in the geographic area using a distributed fibre optic sensing network, and processing the tracking signals to obtain object-specific tracking data;

means for generating an event dataset, including:

isolating a DC-band strain signal from the distributed fibre optic sensing network, the DC-band strain signal being indicative of gross weight-induced changes in a region above a fibre optic cable, using appearance or disappearance of the DC-band strain signal, and tracking data to determine when conditions of the zones are changing as a result of an object entering or exiting a zone; and digitizing and storing the conditions of the zones, and means for rendering a dynamic representation of the conditions of the zones.

18. The system according to claim 17, wherein the means for generating the object tracking dataset using the distributed fibre optic sensing network includes:

a distributed sensing unit for:

repeatedly transmitting, at multiple instants, interrogating optical signals into each of one or more optical fibres distributed across the geographical area and forming at least part of a fibre-optic communications network, receiving, during an observation period following each of the multiple instants, returning optical signals scattered in a distributed manner over distance along the one or more of optical fibres, wherein scattering of the optical signals is influenced by acoustic disturbances caused by multiple objects within the observation period, demodulating acoustic data from the optical signals, and processing the acoustic data to identify tracks made by the objects over a period of time across the geographic area.

19. The system according to claim 18, wherein the one or more optical fibres are supplemented with dedicated or purpose-built trenches or pico-trenches to provide additional sensing coverage.

20. The system according to claim 17, wherein the means for generating an event dataset includes a semantics engine.

* * * * *